Patented June 30, 1931

1,811,868

UNITED STATES PATENT OFFICE

SIEGFRIED SKRAUP, OF WURZBURG, AND OTTO HIRSCHLER, OF DUSSELDORF-OBERKASSEL, GERMANY, ASSIGNORS TO RHEINISCHE KAMPFER-FABRIK G. M. B. H., OF DUSSELDORF-OBERKASSEL, RHINELAND, GERMANY, A GERMAN FIRM

PROCESS FOR PREPARING 1,8-CINEOL (EUCALYPTOL)

No Drawing. Application filed August 10, 1929, Serial No. 385,062, and in Germany August 21, 1928.

The present invention relates to a process for preparing 1,8-cineol. The directions as given in the literature (cf. for example Hollemann "Lehrbuch der organischen Chemie", third edition, page 409) for preparing eucalyptol (1,8-cineol) have been to treat terpin with water-eliminating agents.

It was found that, in order to prepare cineol, not only compounds such as terpin, terpin hydrate and similar compounds may be employed, the Brutto formula of which shows a greater water-content as compared with the composition of cineol, but that compounds, such as terpineol, terpinenol and similar compounds, which possess the same Brutto composition as cineol, may also be employed. On treatment with mineral acids, strong salt solutions, such as zinc chloride solution and the like, the unsaturated alcohol under the influence of, for example, acid first takes up water so that terpin is formed as an intermediate compound, which is then converted into cineol by the elimination of water. When employing these substances the end effect, therefore, only consists of a re-arrangement of the molecule. When treating all the said substances with the dehydrating agents mentioned, however, pure 1,8-cineol is not obtained but a mixture of 1,8-cineol with the isomeric 1,4-cineol and more or less considerable quantities of terpene hydocarbons.

The simultaneous formation of two isomeric cineols in the above mentioned reaction has hitherto not been sufficiently taken into consideration, because both cineols give the identifying reaction with hydrobromic acid prescribed for eucalyptol i. e., both form addition compounds of the same outward behavior owing to the action of the said acid. It may be due to this fact that statements occur in the literature concerning the process of the above mentioned reaction, which contradict the above statements. In actual fact, however, 1,4- and 1,8-cineol are obtained in about equal parts as well as other by-products. A serviceable separation process for mixtures of this kind consisting of 1,4- and 1,8-cineol has hitherto not been known.

It has now been found that 1,4-cineol by itself or in admixture with other compounds such as terpene hydrocarbons, terpineol etc. may be easily reconverted into terpineol or terpin hydrate, by stirring the same at temperatures as much below 0° C. as possible with substances having a hydrating action, whilst 1,8-cineol is not changed at these low temperatures, particularly at minus 10° C., under the above mentioned conditions. The employment of about 60% sulphuric acid or 80% phosphoric acid has proved to be particularly suitable for the hydration. Modifications of the acid concentration or the reaction temperature only influence the degree of purity of the setting point of the eucalyptol obtainable from the solution to a slight extent. It is thus possible in the manner indicated to effect a simple separation of the two isomeric cineols, whereby the valuable eucalyptol (1,8-cineol) is obtained pure and the 1,4-cineol is converted into compounds, which in their turn again yield large quantities of 1,8-cineol by treatment with mineral acids, so that practically no loss of valuable terpene compound takes place on carrying out the described separation process.

Examples 1. 2 kgms. of a mixture of about 45% of terpene hydrocarbons (consisting chiefly of limonene, terpinolene and $\alpha$-, $\beta$- and $\gamma$-terpinene) and about 22% each of 1,4- and 1,8-cineol, which has been obtained by the action of water-eliminating agents on terpin hydrate, terpineol and the like, are cooled to minus 15° C. and introduced in the course of an hour into 2660 grms. of 60% sulphuric acid, which is contained in a closed stirring vessel and is cooled to minus 12° C. The temperature is maintained at minus 10° C. during the addition. The mixture is stirred for a further hour at the same temperature and allowed to stand for 5 hours. About 860 grms. of hydrocarbons are separated from the acid solution and the latter carefully made alkaline at about 0° C. with dilute caustic soda solution. The mixture is then subjected to steam distillation when about 480 grms. of an oil rich in eucalyptol is obtained, which has a solidifying point of about minus 12° C. On separating about 40 grms. of terpineol by means of vacuum distillation a crude eucalyptol is obtained having a solidifying point of about minus 6° C. Pure eucalyptol of solidifying point 0° C. to minus 1° C. and specific gravity (at 20° C.) of 0.926 may be obtained by freezing out.

About 680 grms. of terpin hydrate are obtained from the cooled alkaline solution. The terpin hydrate obtained, as well as the terpineol formed at the same time, may be again treated with water-eliminating agents and the resulting mixture of 1,4- and 1,8-cineol be again subjected to the separation process described above. The terpin hydrate produced may be further worked up according to the following example:

2. 1 kgm. of a mixture of about 45% of hydrocarbons (consisting of limonene, terpinolene and α-, β-, γ-terpinene) and about 22% each of 1,4- and 1,8-cineol yield according to the method described in Example 1, about 210 grms. of crude eucalyptol having a solidifying point of about minus 6° C. as well as about 430 grams. of hydrocarbons, about 350 grms. of terpin hydrate and about 25 grms. of terpineol. These 350 grms. of terpin hydrate are treated according to known processes with water-eliminating agents such, as sulphuric acid. About 25 grms. of a eucalyptol-containing oil mixture is obtained, from which eucalyptol is isolated according to the above process. About 250 grms. of technically valuable terpineol is also obtained.

What we claim is:—

1. The process for preparing 1,8-cineol (eucalyptol) which comprises the steps of treating at temperatures below 0° C. mixtures containing 1,4-cineol and 1,8-cineol with mineral acids having a hydrating action, separating any terpene hydrocarbons which may be present, and subjecting the solution to steam distillation.

2. The processes for preparing 1,8-cineol (eucalyptol) which comprises the steps of treating at temperatures below 0° C. mixtures containing 1,4-cineol and 1,8-cineol with mineral acids having a hydrating action, separating any terpene hydrocarbons which may be present, and subjecting the solution rendered alkaline to steam distillation.

3. The process for preparing 1,8-cineol (eucalyptol) which comprises the steps of treating at temperatures below 0° C. mixtures containing 1,4-cineol and 1,8-cineol with mineral acids having a hydrating action, separating any terpene hydrocarbons which may be present, subjecting the solution rendered alkaline to steam distillation, collecting the crude eucalyptol, subjecting the same to vacuum distillation and freezing out the distillate.

4. The process for preparing 1,8-cineol (eucalyptol) which comprises the steps of treating at temperatures below 0° C. mixtures containing 1,4-cineol and 1,8-cineol with sulphuric acid of about 60% strength, separating any terpene hydrocarbons which may be present, subjecting the solution rendered alkaline to steam distillation, collecting the crude eucalyptol, subjecting the same to vacuum distillation and freezing out the distillate.

5. The process for preparing 1,8-cineol (eucalyptol) which comprises the steps of treating at temperatures below 0° C. mixtures containing 1,4-cineol and 1,8-cineol with phosphoric acid of about 80% strength, separating any terpene hydrocarbons which may be present, subjecting the solution rendered alkaline to steam distillation, collecting the crude eucalyptol, subjecting the same to vacuum distillation and freezing out the distillate.

6. The process for preparing 1,8-cineol (eucalyptol) which comprises the steps of treating at temperatures below 0° C. mixtures containing 1,4-cineol and 1,8-cineol obtained by the action of water-eliminating agents on terpene compounds, the molecular formula of which contains water, with mineral acids having a hydrating action, separating any terpene hydrocarbons which may be present, subjecting the solution rendered alkaline to steam distillation, collecting the crude eucalyptol, subjecting the same to vacuum distillation and freezing out the distillate.

7. The process for preparing 1,8-cineol (eucalyptol) which comprises the steps of treating at temperatures below 0° C. mixtures containing 1,4-cineol and 1,8-cineol obtained by the action of water eliminating agents on terpene compounds of the same molecular formula as eucalyptol with mineral acids having a hydrating action, separating any terpene hydrocarbons which may be present, subjecting the solution rendered alkaline to steam distillation, collecting the crude eucalyptol, subjecting the same to vacuum distillation and freezing out the distillate.

8. The process for preparing 1,8-cineol (eucalyptol) which comprises the steps of treating the mixture obtained on hydrating 1,4-cineol and consisting substantially of terpineol and terpin hydrate, with water-eliminating agents, treating the resulting mixture at temperatures below 0° C. with mineral acids having a hydrating action, separating any terpene hydrocarbons which may be present, and subjecting the solution to steam distillation.

9. The process for preparing 1,8-cineol (eucalyptol) which comprises the steps of treating the mixture obtained on hydrating 1,4-cineol and consisting substantially of terpineol and terpin hydrate, with water-eliminating agents, treating the resulting mixture at temperatures below 0° C. with sulphuric acid of about 60% strength, separating any terpene hydrocarbons which may be present, subjecting the solution rendered alkaline to steam distillation, collecting the crude eucalyptol, subjecting the same to vacuum distillation and freezing out the distillate.

10. The process for preparing 1,8-cineol (eucalyptol) which comprises the steps of treating the mixture obtained on hydrating 1,4-cineol and consisting substantially of terpineol and terpin hydrate, with water-eliminating agents, treating the resulting mixture at temperatures below 0° C. with phosphoric acid of about 80% strength, separating any terpene hydrocarbons which may be present, subjecting the solution rendered alkaline to steam distillation, collecting the crude eucalyptol, subjecting the same to vacuum distillation and freezing out the distillate.

In testimony whereof we affix our signatures.

SIEGFRIED SKRAUP.
OTTO HIRSCHLER.